United States Patent
Duncan et al.

[15] 3,639,945
[45] Feb. 8, 1972

[54] POULTRY CUTTER

[72] Inventors: William D. Duncan; Carolyn L. Duncan, both of Route #4, Box 46A, Kokomo, Ind. 46901

[22] Filed: Aug. 21, 1970

[21] Appl. No.: 66,038

Related U.S. Application Data

[63] Continuation-in-part of Ser. No. 777,990, Nov. 8, 1968, abandoned, Continuation-in-part of Ser. No. 682,955, Nov. 14, 1967, abandoned.

[52] U.S. Cl. ...................................................17/11, 17/52
[51] Int. Cl. .................................................A22c 21/00
[58] Field of Search ...........................................17/11, 45, 52

[56] References Cited

UNITED STATES PATENTS

| | | | |
|---|---|---|---|
| 2,807,046 | 9/1957 | Hebenheimer | 17/11 |
| 2,957,198 | 10/1960 | Cianciolo et al. | 17/11 |
| 3,564,644 | 2/1971 | Cannon | 17/11 |

*Primary Examiner*—Lucie H. Laudenslager
*Attorney*—Christen & Sabol

[57] ABSTRACT

Apparatus for automatically sectioning poultry into a predetermined number of pieces comprising a pair of cutting blades for severing the wings, a pair of cutting blades for severing the breast and legs, a cutting blade for splitting the poultry into two pieces and a cutting blade for severing the thighs from the ribs whereby the poultry is sectioned into nine pieces. A first embodiment utilizes a carriage attached to conveyor chains for moving poultry past the cutting blades, and a second embodiment is vertically aligned to allow gravity to move the poultry past the cutting blades. Another embodiment includes a mechanism for folding the severed wing portions.

31 Claims, 14 Drawing Figures

INVENTORS
William D. Duncan
Carolyn L. Duncan

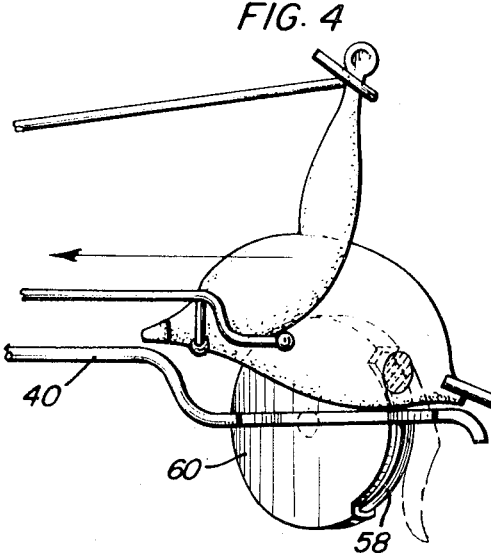
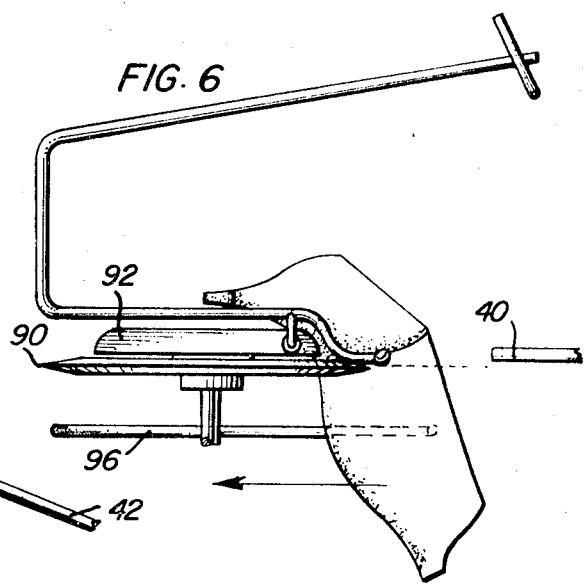
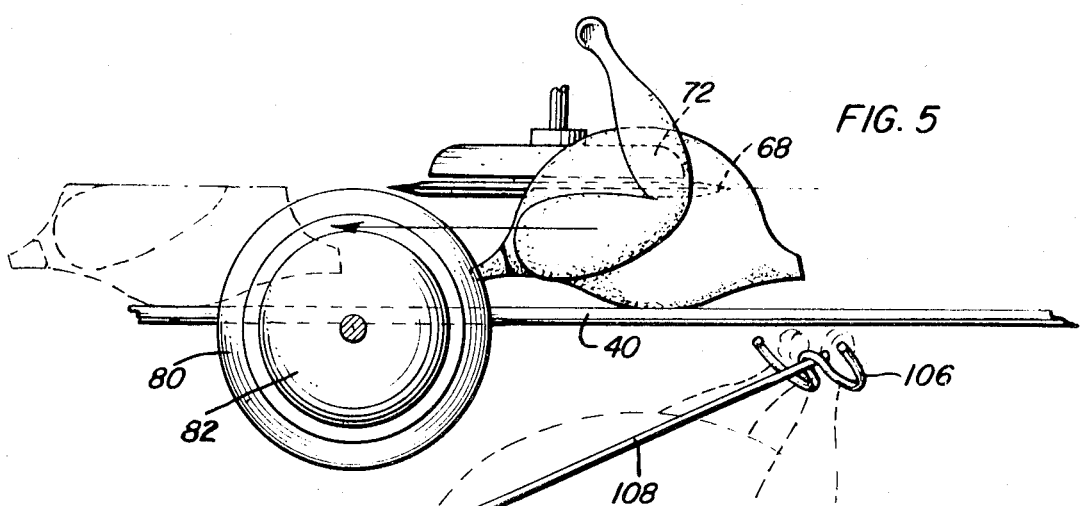
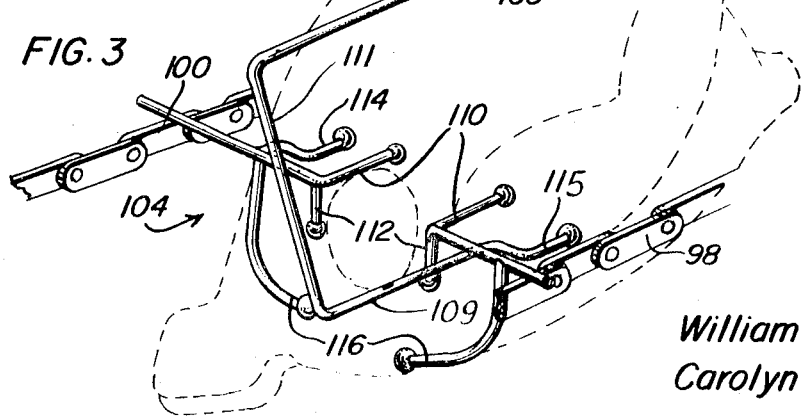

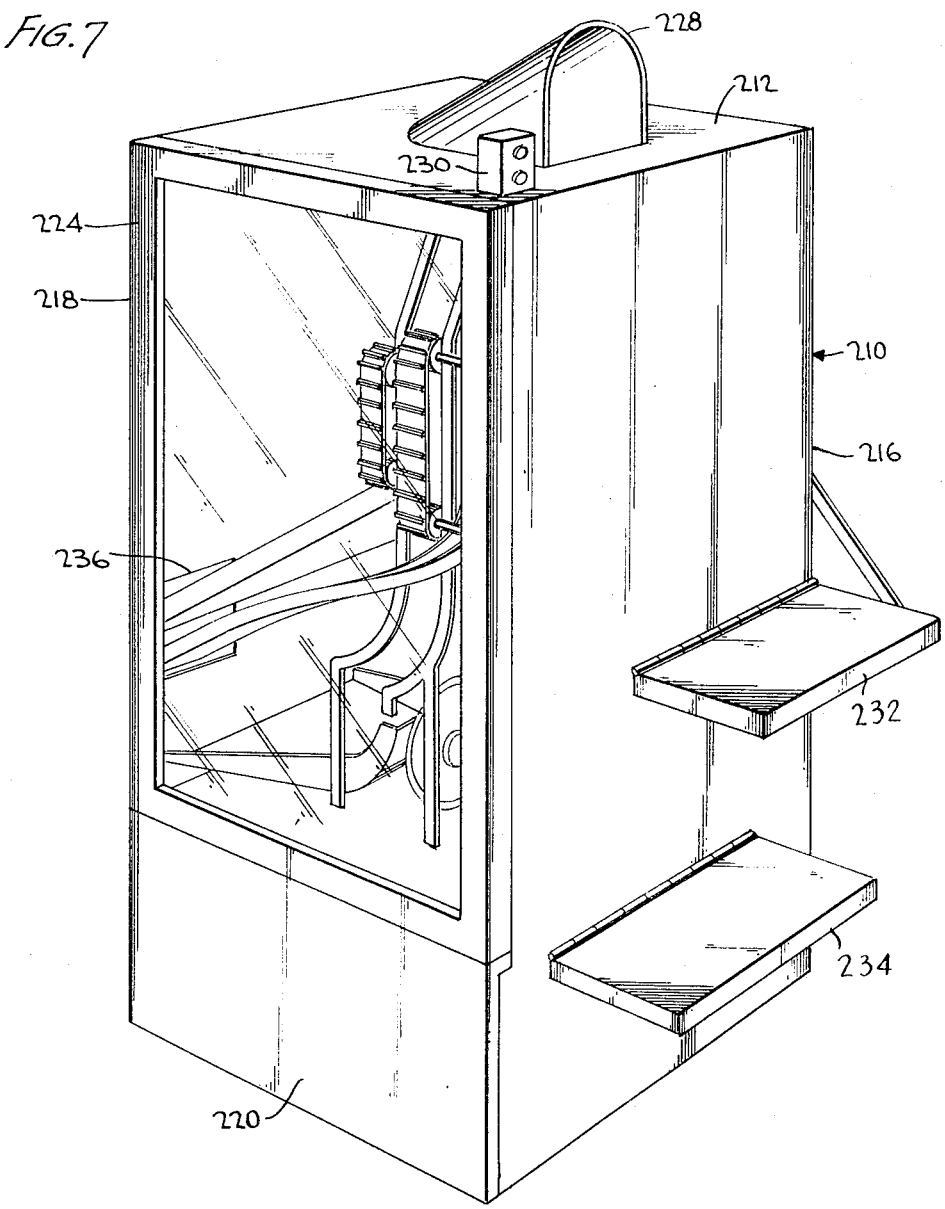

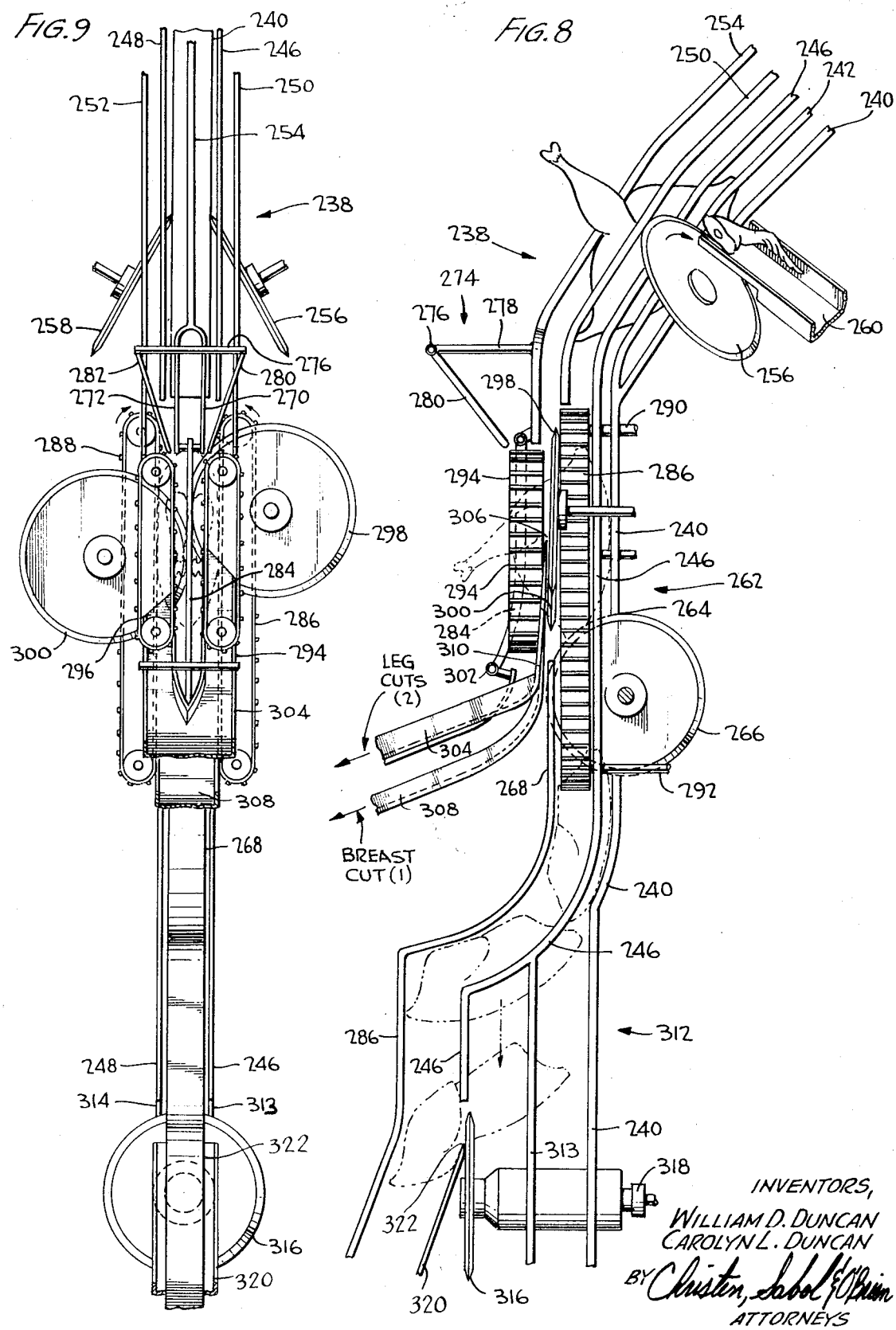

POULTRY CUTTER

The present application is a continuation-in-part of copending application Ser. No. 777,990 filed Nov. 8, 1968, now abandoned, of William D. Duncan and Carolyn L. Duncan, which is a continuation-in-part of Ser. No. 682,955 of William D. Duncan and Carolyn L. Duncan, filed Nov. 14, 1967, now abandoned.

The present invention relates to cutting or sectioning poultry and more particularly to apparatus for automatically cutting or sectioning poultry into any desired number of sections.

In the past any food store, restaurant, carryout or any wholesale purveyor of poultry had to cut its poultry by hand, and this is a time consuming process. Furthermore, cutting poultry by hand necessarily involves irregular cuts due to the human element involved and also involves a safety hazard. When the above establishments have substantial requirements for cut poultry, they must c ut the poultry far in advance of the anticipated sale due to the length of time necessary to cut the poultry by hand. The poultry may be cut as much as a week in advance and, along with the disadvantages of irregular cuts and the involvement of considerable time and labor, there is also a disadvantage from a health standpoint; in that, the longer the length of time between the cutting of the poultry and its use, the greater the opportunity for bacteria growth in the opened portions of poultry. The opportunity for bacteria growth is enhanced considerably by human handling of the poultry when it is cut by hand. A further disadvantage to cutting poultry by hand is the accumulation of bone dust from the cuts in the meat. Recently, the number of people who cook their meals outside on a barbecue grill or pit has increased considerably and chicken is very popular for outdoor barbecuing. This need for sectioned chicken along with the increasing number of carryout shops specializing in fried chicken, has created a need for a means of fast, efficient and accurate poultry cutting.

Accordingly, it is object of the present invention to construct apparatus for automatically sectioning poultry into a predetermined number of pieces.

A further object of the present invention is to automatically section poultry in a predetermined number of pieces by securing the poultry to a conveyor and moving the poultry past a plurality of cutting blades.

Another object of the present invention is to utilize the force of gravity to move poultry past a plurality of blades for sectioning poultry into a predetermined number of pieces.

The present invention has another object in that apparatus for automatically sectioning poultry is constructed such that the poultry need only be placed by hand or automatically in the proper position in a chute at the top of the apparatus in order to obtain a predetermined number of pieces of poultry.

A further object of the present invention is construct apparatus capable of automatically placing poultry in the proper position for sectioning without manually positioning the parts of the poultry.

Another object of the present invention is to utilize a carriage to firmly position poultry to assure accurate sectioning of the poultry.

One of the advantages of the present invention is the speed with which poultry may be cut. This speed provides great savings in time and labor, and also reduces the opportunity for bacteria growth in the poultry since the poultry need not be cut far in advance of its ultimate use. Another advantage is the uniformity of cuts obtained due to the removal of the human error factor. A further advantage of the poultry cutter of the present invention is that human handling of the poultry is maintained at a minimum.

The present invention is generally characterized in apparatus for sectioning poultry into a predetermined number of pieces comprising a plurality of cutting means, guide means connected with the cutting means for positioning and supporting the poultry to assure accurate sectioning and means for moving the poultry past the cutting means whereby the poultry is sectioned.

Still another object of the invention is to provide means arranged in connection with a set of rotating knives for severing the wings from the body which will automatically accept the severed wings and fold them into a compact form for later handling, or for cooking.

Further objects and advantages of the present invention will become apparent from the description of the preferred embodiments as shown in the accompanying drawings.

FIG. 3 is a pictorial representation of a carriage for use with the poultry cutter of FIG. 1.

FIG. 4 is a side view of the first cut of the poultry by the poultry cutter of FIG. 1.

FIG. 5 is a side view of the second and third cuts of the poultry by the poultry cutter of FIG. 1.

FIG. 6 is a side view of the fourth cut of the poultry by the poultry cutter of FIG. 1.

FIG. 7 is a perspective view of an enclosure for use with the second embodiment of the present invention.

FIG. is an elevational side view of poultry cutting apparatus according to the second embodiment of the present invention.

FIG. 9 is an elevational front view of the apparatus of FIG. 8.

Figure 10:
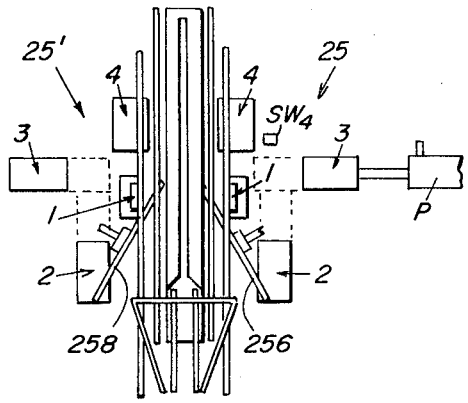

FIG. 10 is a front elevation of a modification, which includes means for accepting the severed wings and folding them.

Figure 11:
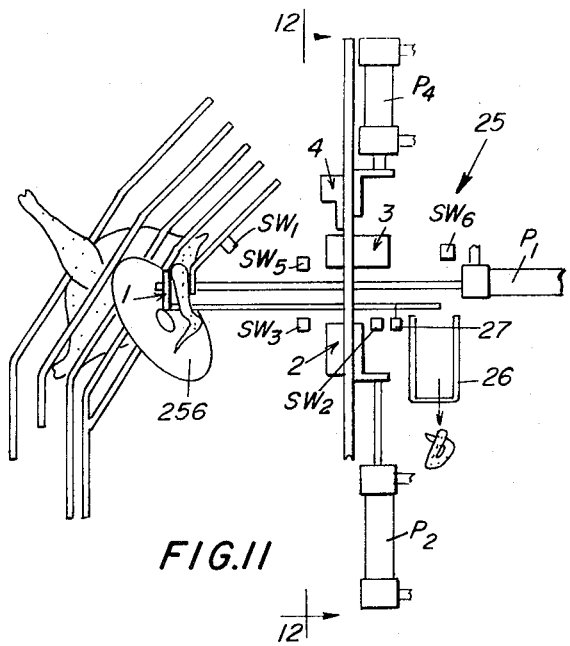

FIG. 11 is a side elevation of the mechanism shown in FIG. 10.

Figure 12:
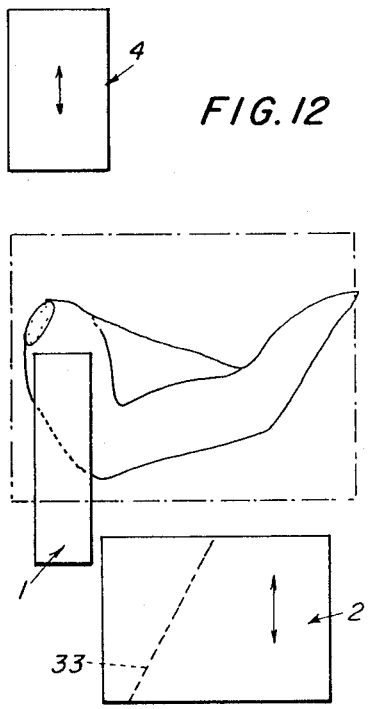

FIG. 12 is a fragmentary view of the folding mechanism on an enlarged scale as viewed from the line 12—12 of FIG. 11.

Figure 13:
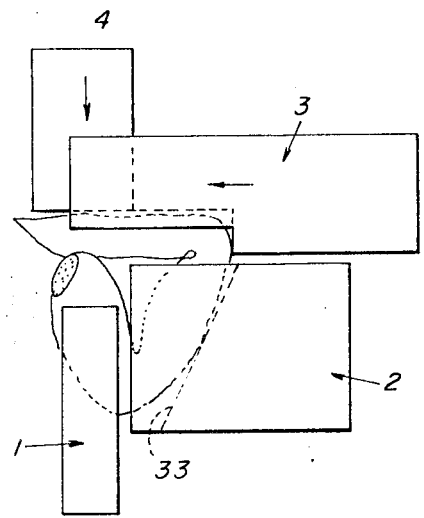
Figure 14:
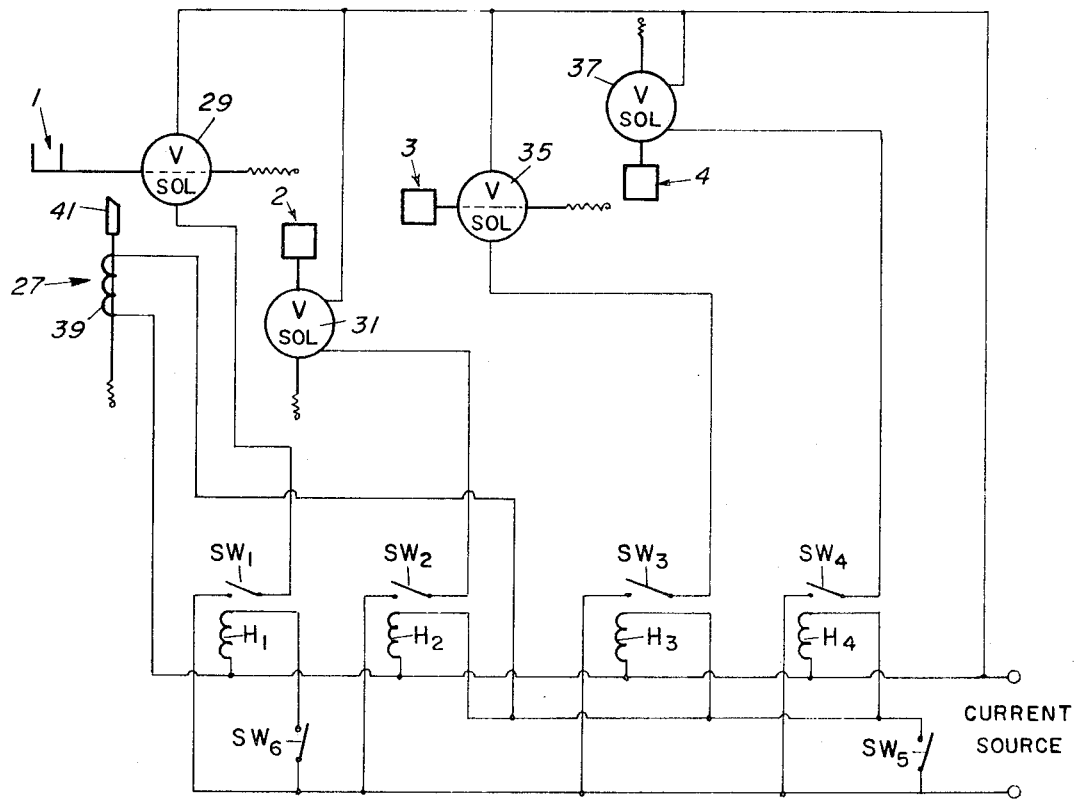

FIG. 13 is a view similar to FIG. 12, showing the completed folding operation, and;

FIG. 14 is a schematic diagram of the control system for the folding means.

Figure 1:
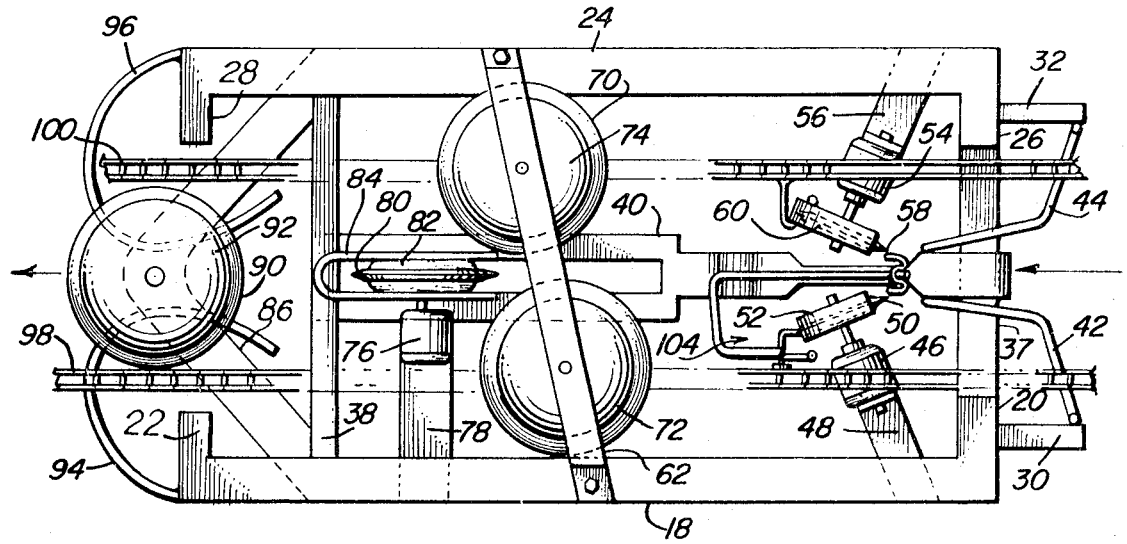
FIG. 1 is a top view of a first embodiment of a poultry cutter according to the present invention.
Figure 2:
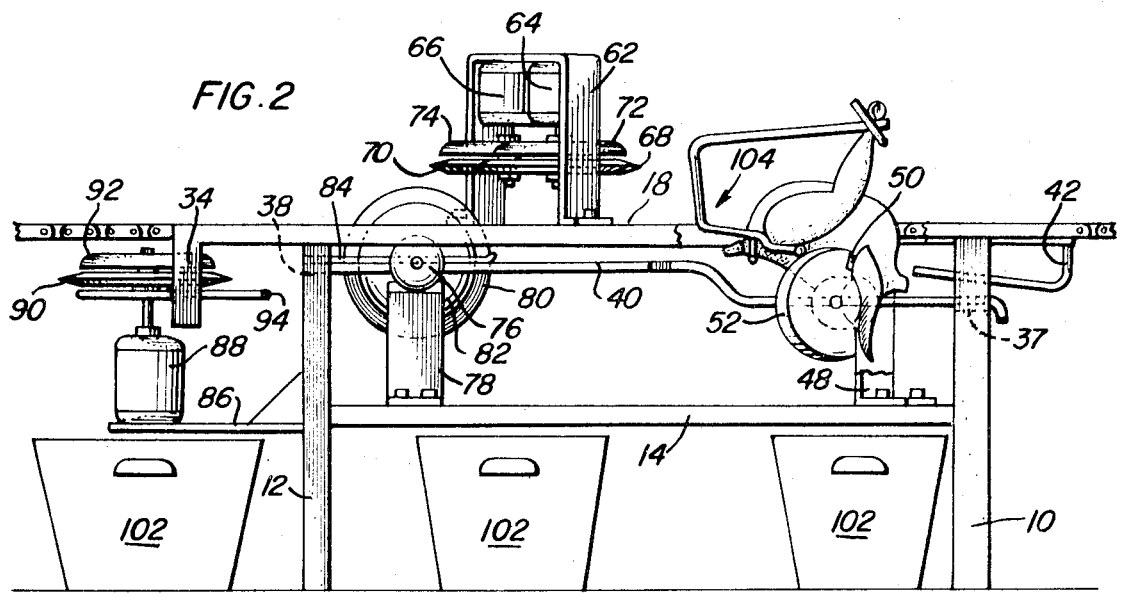
FIG. 2 is a side view of the poultry cutter of FIG. 1.

A first embodiment of a poultry cutter according to the present invention is illustrated in FIGS. 1 and 2, which are top and side views, respectively. The cutting and guiding apparatus of the poultry cutter is supported by a frame having a pair of front legs 10, a pair of rear legs 12, an intermediate longitudinal member 14 attached at one end to front leg 10 on one side of the frame and at its other end to rear leg 12 on the same side of the frame, and a similar intermediate longitudinal member is attached at one end to front leg 10 on the other side of the frame and at its other end to rear leg 12 on the same side of the frame. A longitudinal member 18 extends across the top of the frame on the same side as member 14 and has a right-angled extension 20 at the front thereof and a right-angled extension 22 at the rear thereof. A longitudinal member 24 extends across the top of the frame on the same side as member 16 and has a right-angled extension 26 at the front thereof and a right-angled extension 28 at the rear thereof. Horizontal members 30 and 32 are attached to extensions 20 and 26, respectively, and vertical members 34 are attached to extension 22 and 28, respectively. A crossmember 37 is attached to the two front legs 10 at a location below members 18 and 24, and a crossmember 38 is attached to the two rear legs 12 at a point below members 18 and 24.

The cutting and guiding apparatus includes a center guide strip 40 having a first level at the front of the guide strip and second level at the rear of the guide strip. The front of guide strip 40 is attached to crossmember 37 and is curved to accept the poultry smoothly. A narrowed portion of guide strip 40 connects the curved front portion with a widened portion that curves up to the second level which has a longitudinal slot therein and is attached to crossmember 38. Tubular guides 42 and 44 are attached to members 30 and 32, respectively, and extend down and into the center of the poultry cutter. A motor 46 is supported by a right-angled member 48 having its base attached to member 14, and a shaft of motor 46 is attached to a rotary cutting blade 50 having a shield 52. A motor 54 is supported by a right-angled member 56 having its base attached to member 16, and a shaft of motor 54 is attached to a rotary cutting blade 58 having a shield 60. The blades 50 and 58 are disposed in a vertical plane and at an angle to guide strip 40. An inverted U-shaped member 62 is disposed diagonally across the top of the frame of the poultry cutter and is attached to members 18 and 24 at either side. Two motors 64 and 66 are attached to the top of member 62 and the shafts of motors 64 and 66 are attached to rotary cutting blades 68 and 70 having shields 72 and 74, respectively. Blades 68 and 70 are disposed in horizontal plane over the second level of guide strip 40. A motor 76 is supported by a right-angled member 78 which is attached at its base to member 14 and a shaft of motor 76 is attached to a rotary cutting blade 80 having a shield 82, a U-shaped tubular guide 84 and disposed in a vertical plane through the slot in the second level of guide strip 40. A horizontally disposed platform 86 is attached to rear legs 12 and supports a motor 88 which has a rotary cutting blade 90, having a shield 92, attached to its shaft. Blade 90 is disposed in a horizontal plane at a level approximately equal to the second level of guide strip 40, and curved tubular guides 94 and 96, which are attached to members 34 and 36, respectively, extend into the center of the poultry cutter on either side of blade 90. Any means of catching the sections of poultry as they are severed, such as baskets 102 or one basket with chutes leading thereto from the cutting blades, may be placed under the poultry cutter.

Conveyor chains 98 and 100 run parallel to one another from the front of the poultry cutter to the rear thereof and are not shown in a complete loop since any conventional path may be used to complete the loop. For instance, the loop may be completed over the top of the poultry cutter or underneath it. In any case, the primary consideration in completing the conveying loop is the provision of adequate working space to allow poultry to be successively secured to the conveyor on a plurality of carriages and carried through the poultry cutter to cut a maximum number of poultry within a prescribed time.

The poultry, which is already cleaned and dressed, is secured to conveyor chains 98 and 100 by a carriage 104 shown in the vicinity of blades 50 and 58 in FIG. 2 and illustrated in detail in FIG. 3. Carriage 104 includes a leg clamp 106 and a supporting rod 108 for leg clamp 106 which is attached to conveyor chain 98. 104 includes a leg clamp 106 and a supporting rod 108 for leg clamp 106 which is attached to conveyor chain 98. Supporting rod 108 has a bottom portion 109 which extends longitudinally and parallel to conveyor chain 98, an upstanding portion 111 which extends diagonally up into the center of the poultry cutter to avoid blades 68, 70 and 80, and a top portion which extends back to leg clamp 106. The poultry is inserted tail first on the carriage and is secured thereto by rods 110, 112, 114, 115 and 116 which are attached to conveyor chains 98 and 100. Rods 110 extend in a horizontal plane from conveyor chains 98 and 100 and are right angled to be inserted between each thigh and the breast of the poultry to hold the skin taut for easier cuts. Rods 112 extend in a horizontal plane from conveyor chains 98 and 100 and are right angled to be inserted into the pelvic girdle of the poultry. Rod 114 extends down in a curved manner from conveyor chain 100 and a forward extension 115 of rod 109, which is secured to one of the transverse horizontal carriage rods which rests on chain 98, is offset laterally to complement rod 114 support the thighs of the poultry, and rods 116 extend down into the center of the conveyor in a curved manner to support the back of the poultry and cooperate with rods 112 to clamp the poultry and hold it firmly.

FIGS. 4, 5 and 6 are illustrations of the various cuts of the poultry and will be utilized to aid in the description of the operation of the poultry cutter of FIGS. 1 and 2.

The poultry enters tail first at the front or right-hand side of the poultry cutter and is supported only by carriage 104. As the poultry approaches blades 50 and 58 for the first cut, as shown in FIG. 4, its back rides up onto the first level of guide strip 40; however, the tail of the poultry is higher than the upper back, and consequently the wings are extended to facilitate their severance. Guides 42 and 44 assure correct positioning of the poultry and its wings, and as the poultry is drawn past blades 50 and 58 both wings are severed and drop into brackets 102.

The second and third cuts are shown in FIG. 5 with blades 68 and 70 providing the second cut and blade 80 providing the third cut. After the poultry passes blades 50 and 58 its back rides up onto and is supported by the second level of guide strip 40 in preparation for the second cut. Due to the back support, leg clamp 104 and rods 114 and 115, the poultry is positioned such that blades 68 and 70 sever the legs from the thighs near the joints and the breast from the poultry, and the breast and legs drop into baskets 102. The third cut is accomplished by blade 80 which splits the backbone and rib cage of the poultry longitudinally down the center, and guide 84 assures a clean split of the halves of the poultry.

The fourth cut is shown in FIG. 6 and is provided by blade 90. After the poultry is carried past the rear of guide strip 40 there is no back support, and the poultry will be supported only by carriage 104 which allows the neck end of the poultry to swing down. Guides 94 and 96 position the poultry for the fourth cut and also keep the halves together to assure a more accurate and uniform cut. Blade 90 severs the ribs from the thighs and the ribs drop into basket 102 while the thighs may be freed from carriage 104 by hand or by an obstruction positioned above the conveyor chains to knock the thighs loose as the carriage passes.

Shields 52, 60, 72, 82 and 92 or blades 50, 58, 68, 70, 80, and 90 cover all but the cutting edges and prevent meat from laying on the blades thereby reducing blade wear along with providing cleaner cuts and cleaner meat.

The blades may be adjusted to accommodate varying sized of poultry by moving blades 50, 58, 68, 70 and 90 along their respective axes to obtain the desired cuts and replacing blade 80 with a larger blade to cleanly split the poultry.

As described above, the poultry has been cut into nine pieces; that is, two wings, two legs, a breast, two ribs and two thighs. However, if fewer or more cuts are desired, blades may be removed or adjusted to obtain the desired number of pieces.

An enclosure or use with a second embodiment of the present invention is illustrated in FIG. 7 and comprises a housing, indicated generally by numeral 210 and having a hingedly attached front door 224 provided with a transparent window therein in order to permit viewing of the operation of the poultry cutting apparatus. Below door 224 is a removable panel 220 which provides access to the driving means, as will be explained hereinafter.

An arcuate entrance chute 228 extends through top 212 of housing 210 to permit insertion of poultry to be sectioned. Also disposed on top 212 is an electrical switch 230 for controlling the operation of the cutting blades for the poultry-cutting apparatus. Two cantilevered shelves 232 and 234 are hingedly disposed and vertically spaced on side 216 of housing 210 for storage purposes and also for permitting access to entrance chute 228, and shelves 232 and 234 may be folded against side 216 when not in use. Side 218 has an opening 236 therein for accommodating poultry pieces discharged from the interior of housing 210, and any suitable means may be disposed under the exit chutes to catch the sectioned pieces of poultry.

In operation, the operator of the poultry cutter places cleaned and dressed poultry at entrance chute 228 in a predescribed position and actuates switch 230. The poultry will fall by gravity through housing 210 and be sectioned by cutting means therein into two wings, two legs, a breast, two thighs and two ribs. These pieces will exit the housing through chutes leading to opening 236 and may be collected in any suitable means disposed thereunder. Should any pieces of the poultry or the body of the poultry become stuck in the apparatus for any reason, it may be detected through door 224 and the problem remedied by opening the door and nudging or removing the pieces or body to permit continued operation of the apparatus. Poultry may be sectioned at a rate dependent only upon the speed of passage through the housing of the poultry and, consequently, poultry may be successively positioned at entrance chute 228 for successive sectioning.

Apparatus for sectioning poultry into a predetermined number of pieces according to the second embodiment of the present invention is illustrated in side elevation in FIG. 8 and front elevation in FIG. 9.

The apparatus is substantially vertically aligned and includes an upper, angled portion 238 which comprises a flat center strip 240 for supporting the back of the poultry, a pair of parallel rods or wing guides 242 for positioning the wings of the poultry, a pair of parallel rods or thigh supports 246 and 248 for supporting the thighs of the poultry, a pair of parallel rods or leg guides 250 and 252 for positioning the legs of the poultry, and a narrow, flat center strip 254 or breast guide for guiding the poultry. The upper ends of strips 240 and 254 and rods 242, 246, 248, 250 and 252 extend into entrance chute 228 so that poultry placed in chute 228 on its back, tail first, will automatically be correctly positioned and supported by the upper portion 238.

A pair of angularly oriented, circular cutting blades 256 and 258 are symmetrically disposed adjacent wing guides 242, respectively, and are positioned such that thigh supports 246 and 248 and leg guides 250 and 252 do not interfere therewith. A pair of wing chutes 260, only one of which is illustrated, are disposed so as to collect the wings as they are severed by blades 256 and 258, respectively and deliver the wings to opening 236 in housing 210. Below blades 256 and 258 wing guides 242 merge with back support 240 since they are no longer needed, and back support 240, thigh supports 246 and 248, leg guides 250 and 252, and breast guide 254 are offset to the vertical to form a center portion 262.

Vertical center portion 262 includes back support 240 which has a slot 264 in the center thereof to accommodate a circular cutting blade 266 which has its axis disposed horizontally. Center portion 262 further includes parallel thigh supports 246 and 248 and a breast guide 268 having a flat shape. Breast guide 254 is bifurcated to form two arms 270 and 272 to which is secured a triangular guide 274 opened at one end for guiding the legs of the poultry to a conveyor system. A top support member 276 of guide 274 is spaced horizontally from the vertical portion of breast guide 254 by a pair of support members 278 in order to permit the legs of the poultry to pass thereunder, and arms 280 and 282 extend down and inward from the ends of member 276 to assure that the legs of the poultry are disposed on either side of a center guide 284 pivotally connected with arms 270 and 272 and extending through the center of the conveyor system.

The conveyor system comprises a first pair of vertically disposed, parallel conveyor belts 286 and 288 driven by shafts 290 and 292 and a second pair of vertically disposed, parallel conveyor belts 294 and 296 horizontally disposed from the first pair of conveyor belts. The first pair of conveyor belts 286 and 288 are disposed directly below the lower ends of leg guides 250 and 252 and spaced from each other to grasp the body of the poultry at the thighs, and the second pair of conveyor belts 294 and 296 are disposed directly below guide arms 280 and 282 and spaced from each other to grasp the legs of the poultry along with center guide 284. The second pair of conveyor belts 294 and 296 are driven at a faster speed than the first pair of conveyor belts 286 and 288 to thereby move the legs toward the tail end of the poultry.

A pair of circular cutting blades 298 and 300 are disposed so that their axes are horizontal and vertically offset from each other, and blades 298 and 300 are positioned between the first and second pairs of conveyor belts in order to sever the legs from the thighs and the breast from the body of the poultry. Center guide 284 is pivotally connected with a guide 302 which rides in a chute 304 that has a pair of sharp-edged feed trays 306 disposed on either side of the conveyor system for collecting the severed legs and delivering the legs to opening 236 in housing 210. A chute 300 is disposed below feed trays 306 and has a sharp edge 310 for collecting the breast as it is severed from the poultry and delivering the breast to opening 236 in housing 210. Circular blade 266 extends above the first pair of conveyor belts to the vertical plane of blades 298 and 300 in order to split the body of the poultry into two pieces down the center.

A lower portion 312 of the apparatus includes back support 240, thigh supports 246 and 248, and breast guide 268 all of which are curvedly offset into vertical segments. Thigh supports 246 and 248 act to hold the split body of the poultry together; and accordingly a pair of parallel branches 313 and 314 of thigh supports 246 and 248, respectively, extend vertically in order to hold the body of the poultry together after it has been horizontally positioned due to the curved offset. A circuit cutting blade 316 has its axis horizontally disposed and is positioned directly below the lower ends of thigh supports 246 and 248. A conventional spindle 318 is shown for rotating blade 316, and such spindles may be used with all of the above described circular cutting blades. A chute 320 has a sharp edge 322 disposed adjacent blade 316 in order to collect the thighs as they are severed from the ribs by blade 316, and the ribs may be collected and delivered to opening 236 in housing 210 along with the thighs by a chute, not shown, located below bottom portion 312.

In operation, the poultry is positioned tail first at chute 228 such that its back will ride on back support 240, and the poultry then falls by gravity such that its thighs are supported on thigh supports 246 and 248 and its wings hang over wing guides 242 at upper portion 238 of the apparatus.

As the poultry moves past blades 256 and 258, the wings are severed and exit the housing at opening 236 through chute 260, and as the poultry enters center portion 262 from upper portion 238, it is vertically disposed so that the body of the poultry is grasped at the thighs between conveyor belts 286 and 288. The legs are guided between arms 270 and 272 of the bifurcated breast guide 254 and legs 280 and 282 of triangular guide 274 to conveyor belts 294 and 296 which grasp the legs with the aid of center guide 284. Due to the faster speed of conveyor belts 294 and 296 as compared with the speed of conveyor belts 286 and 288, the legs are moved towards the tail end of the poultry in order to position them for sectioning by blades 298 and 300. Along with severing the legs of the poultry from the thighs, blades 298 and 300 also sever the breast of the poultry and the legs and breast are collected and delivered to opening 236 in housing 210 by chutes 304 and 308, respectively. After passing blades 298 and 300, the body of the poultry is split down the center while still in the grasp of conveyor belts 286 and 288 by blade 266.

The split body of the poultry is then changed from a vertical position as it exits from center position 262 to a horizontal position by the curved offset portion leading to lower portion 312. Thigh supports 246 and 248 clamp the split halves of the poultry together as it slides into the lower portion 312 of the apparatus and breast guide 268 further serves to retain the split poultry in one piece. As the poultry enters lower portion 312, its horizontal position permits the thighs to be cut from the ribs by blade 316, and the thighs and the ribs are collected and delivered to opening 236 in housing 210.

While the operation of the apparatus of the second embodiment of the present invention has been explained with manual placement of poultry at entrance chute 228, the apparatus of the present invention may be further automatically mechanized by utilizing a conveyor belt leading to entrance chute 228 for carrying poultry on its back, tail end first, to entrance chute 228 which permits successive pieces of poultry to be sectioned at a rapid rate. This automatic operation is made possible by the structure of the apparatus which automatically guides and supports the poultry as it enters housing 210 to position the poultry for proper cuts.

It is desirable to have blades 246, 258 and 266 rotate clockwise or counterclockwise as shown in FIG. 8 in order not to, in any way, affect the positioning of the poultry should it be below average size. Similarly, it is desired to have blades 298 and 300 rotate counterclockwise and clockwise, respectively, as shown in FIG. 9, in order to bias the poultry towards the center of the apparatus. Due to the precise placement and sharp edges of the chutes for delivering the sectioned poultry to opening 236 of housing 210, meat is prevented from laying on the blades and adversely affecting the accuracy and cleanliness of the cuts and the sectioned pieces, respectively, and accordingly no blade shields are required.

The apparatus o FIGS. 8 and 9 may be secured to enclosure 210 in any conventional manner as long as the securing means do not interfere with the path of the poultry through the apparatus.

In order to aid gravity in moving the poultry through the apparatus, it may be desirable to provide a vibrator connected with the structure of the apparatus in order to prevent the poultry and/or sectioned pieces from sticking in the apparatus. Similarly, at the curved offset portion leading from center portion 262 to lower portion 312 a wheel may be utilized to drive the split poultry around the curve and into lower portion 312.

Any conventional drive means may be utilized with the second embodiment of the present invention and preferably is located beneath the apparatus in enclosure 210, and flexible shafts may be utilized along with spindles to rotate the cutting blades and conveyor belts.

As noted with respect to the first embodiment of the present invention, the cutting blades of the second embodiment may be adjustable to accommodate poultry of varying sizes and blades may be added or removed to section the poultry into a greater or lesser number of pieces.

A further modification of the invention is shown in FIGS. 10–14, in which a mechanism for folding a wing after it has been severed by the rotary blades 256 and 258 of the first cutting means is indicated generally by numerals 25 and 25¹ respectively positioned to the right and left sides of the two blades, as seen in FIG. 10, each of the two folding means is substantially identical in construction except for being mirror images of each other, therefore only one of them needs to be described in detail.

The wing folding is accomplished by means of a carrier 1 and three coacting block-shaped members 2, 3 and 4. These four elements are mounted for reciprocating movement adjacent the knife 256 which severs the wing from the body and are actuated in sequence by means of fluid operated pistons, indicated respectively as $P_1$, $P_2$, $P_3$ and $P_4$ in FIGS. 10 and 11. These pistons are biassed by means of springs, or other means to urge them normally into a first position, at one end of their respective strokes, as shown in FIG. 10 and 11, so that in this condition the members 2, 3 and 4 are spaced apart from each other, as shown in FIG. 12. Where fluid under pressure is admitted to each of the pistons, under the control of means such as a solenoid-operated valve, the pistons are urged to move toward the other end of their respective strokes and when a valve is operated, the respective piston will return its original position. Such devices are well known in the art and need not be described in detail as they form no part of this invention as will be now described, the valves which control the pistons may be operated by a series of switches $SW_1$, $SW_2$, $SW_3$ and $SW_4$, as shown in the schematic diagram of FIG. 14.

As shown in the diagram $SW_1$, $SW_2$, $SW_3$ and $SW_4$ normally open switches which include electrically energizeable holding coils which are of the type such that when the coils are energized their influence is insufficient to close the switch but which, once the switch has been closed will remain closed until the holding coil is deenergized; at which time the switch will reopen. In addition, the circuit includes a normally closed switch $SW_5$, for controlling the holding coils for $SW_2$, $SW_3$ and $SW_4$ and a latch means 27, which is positioned to restrict movement of element 1 until released, and another normally closed switch $SW_6$ which controls the holding coil of $SW_1$. Switches of this type are all well known in the art.

$SW_1$ is positioned adjacent the cutter 256, and is provided with an actuator which will be contacted by a wing as it is severed by the cutter. At that point the carrier 1, which may be in the form of an upright fork, is positioned so that the severed wing falls into the fork. At the same time, the contact of the wing with switch $SW_1$ causes it to close and thus energize the solenoid valve 29 for piston $P_1$ causing it to move the carrier 1 with the severed wing to the right, as seen in FIG. 11, until it is stopped by the normally energized latch 27 at the folding station. As the carrier comes into this position it contacts switch $SW_2$ to close it and energize solenoid valve 31, causing piston $P_2$ to move folding member 2 up to make the first fold by engaging the wing with its slanting forward recessed face 33. At the same time member 2 engages switch $SW_3$ to close the circuit for solenoid valve 35 causes piston $P_3$ to move folding member 3 inwardly from the side to move the wing tip inwardly. This movement, in turn engages the switch $SW_4$ to close the circuit to solenoid valve 37 which causes piston $P_4$ to move the member 4 downwardly to lock the wing in the folded position as shown in FIG. 13.

At this point it should be noted from the diagram of FIG. 14, that since both switches $SW_5$ and $SW_6$ are normally closed, a circuit has been maintained from the current source such that the holding coils $H_1$, $H_2$, $H_3$ and $H_4$ for the switches $SW_1$, $SW_2$, $SW_3$ and $SW_4$ and the actuating solenoid 39 for the latch have all been energized during the previously described operations. However, when the last piston moves folding member 4 down to lock the wing closed, it engages the switch $SW_5$ to open it. The result is that, momentarily, switches $SW_2$, $SW_3$ and $SW_4$ return to their open position, causing the solenoid valves 31, 35 and 37 to close and permitting the respective pistons to return the folding members 2, 3 and 4 to their retracted positions of FIG. 12. At the same time, latch 27, being also deenergized drops and, because the circuit to holding coil $H_1$ for $SW_1$ is still closed by switch $SW_6$ the switch is still holding solenoid valve 29 open and piston $P_1$ moves the carrier 1 to the right, beyond retracted latch 27, until the carrier reaches a position above the chute 260, where the folded wing is deposited. Finally, at this point the carrier 1 engages $SW_6$ to open the circuit to holding coil $H_1$ and switch $SW_1$ is opened to close solenoid valve 29. Once closed, the biassing spring returns the carrier to the position adjacent the cutter 256. In this connection, it should be noted that, while switch $SW_5$ has reclosed as soon as the folding member 4 began its retracting movement upward and the holding coils for switches $SW_2$, $SW_3$ and $SW_4$ are now reenergized, the force of the holding coils is not sufficient to close the open switches, but only sufficient to hold them closed when closed by external actuation. In addition, while closure of switch $SW_5$ also energizes the solenoid 39, causing the latch 27 to rise, the rearward surface 41 of the latch may be disposed at an angle to cause the latch to be depressed when the carrier moves past it from the right-hand side. Also, as soon as carrier 1 begins its return stroke, switch $SW_6$ recloses to energize the holding coil for switch $SW_1$ but, the switch will remain open until actuated by a succeeding wing severed by the cutter 256, and the above-described cycle of operation will be repeated.

Inasmuch as the present invention is subject to many variations, modifications and changes in detail, it is intended that all matter described in the foregoing specification or shown in the accompanying drawings shall be interpreted as illustrative and not in a limiting sense.

What is claimed is:

1. Apparatus for automatically sectioning poultry into a predetermined number of pieces comprising first cutting means; first guide means disposed adjacent said first cutting means for positioning the poultry such that the wings are severed from the body by said first cutting means; second cutting means; second guide means disposed between said first cutting means and said second cutting means for positioning the poultry such that the legs are severed from the thighs and the breast is severed from the body and the body is split into two pieces by said second cutting means; third cutting means; and third guide means disposed between said second cutting means and said third cutting means for positioning the poultry such that the thighs are severed from the ribs by said third cutting means.

2. The apparatus as recited in claim 1 which includes fourth cutting means and said second guide means includes fourth guide means disposed between said first cutting means and said fourth guide means disposed between said first cutting means and said fourth cutting means for positioning the poultry such that the legs and breast are severed respectively from the thighs and body by said second and third cutting means and for positioning the poultry such that the body is split into two pieces by said fourth cutting means.

3. Poultry cutting apparatus comprising in combination, a plurality of cutting means, conveyor means for moving a poultry body in a guide means arranged relative to said cutting means to position selected portions of a poultry body moving on the conveyor means for selectively severing of the wings from the body, and thighs from said body; for severing the legs from the thighs and for severing the breast from the body during said movement.

4. The invention as recited in claim 3 wherein one of said cutting means is disposed in a plane parallel to and above said conveyor means.

5. The invention as recited in claim 3 wherein one of said cutting means is disposed in a plane parallel to and below said conveyor means.

6. The invention as recited in claim 3 wherein one of said cutting means is disposed in a plane transverse to said conveyor means to split the body into two pieces.

7. The invention as recited in claim 3 wherein said conveyor means includes means for securing the poultry to said conveyor.

8. The invention as recited in claim 3 whereby said conveyor means includes means secured to said conveyor means for grasping the poultry at its pelvic girdle whereby the poultry is attached to the conveyor means at one end and the other end is free to move up and down.

9. A poultry cutter comprising a plurality of cutting means; a plurality of guide means associated with said cutting means to assure proper cuts; means for automatically conveying the poultry past said cutting means whereby the poultry is severed into a predetermined number of pieces, said conveying means including conveyor and a carriage secured to said conveyor having means for grasping the legs of the poultry, means for grasping the pelvic girdle of the poultry, means for supporting the lower back of the poultry and means for supporting the thighs of the poultry.

10. A poultry cutter comprising a plurality of cutting means; a plurality of guide means associated with said cutting means to assure proper cuts; means for automatically conveying the poultry past said cutting means including means securing the poultry to said conveying means whereby the poultry is severed into a predetermined number of pieces, said guide means including a guide strip having first and second levels, and a first one of said cutting means is disposed adjacent said first level of said guide strip whereby the poultry is supported by said securing means and by said first level of said guide strip such that its wings are extended and severed by said first one of said cutting means.

11. The invention as recited in claim 10 wherein a second one of said cutting means is disposed adjacent said second level of said guide strip whereby the poultry is supported by said securing means and by said second level of said guide strip such that its breast and legs are severed by said second one of said cutting means.

12. The invention as recited in claim 11 wherein a third one of said cutting means is disposed adjacent said second level of said guide strip whereby the poultry is split in half by said third one of said cutting means.

13. The invention as recited in claim 12 wherein a fourth one of said cutting means is disposed away from said guide strip whereby the poultry is supported by said securing means such that the thighs are severed from the ribs by said fourth one of said cutting means.

14. Apparatus for sectioning poultry into a predetermined number of pieces comprising a plurality of cutting means arranged in a substantially vertical alignment; guide means connected with said plurality of cutting means; positioning means for supporting poultry in proper position for sectioning; and means for inserting poultry at the top of said apparatus whereby poultry moves past said plurality of cutting means due to the force of gravity; said positioning means including a plurality of rods for supporting the sides of the poultry, said guide means including a plurality of vertically aligned rods, and said plurality of cutting means including blade means disposed adjacent said plurality of guide rods for severing the thighs from the ribs of the poultry.

15. Apparatus for sectioning poultry into a predetermined number of pieces comprising a plurality of cutting means arranged in a substantially vertical alignment; guide means connected with said plurality of cutting means for guiding poultry past said plurality of cutting means; positioning means for supporting poultry in proper position for sectioning; and means for inserting poultry at the top of said apparatus whereby poultry moves past said plurality of cutting means due to the force of gravity; said positioning means including first conveyor means operating at a first speed for grasping the legs of the poultry and second conveyor means operating at a second speed slower than said first speed for grasping the body of the poultry, and said plurality of cutting means including first blade means disposed between said first conveyor means and said second conveyor means for severing the legs and breast from the poultry and second blade means disposed adjacent said second conveyor means for splitting the poultry into two pieces.

16. The apparatus as recited in claim 15 wherein said first conveyor means includes a pair of conveyor belts disposed in parallel for grasping the legs of the poultry therebetween, said second conveyor means includes a pair of conveyor belts disposed in parallel for grasping the body of the poultry therebetween, and second blade means includes a rotary blade extending between said conveyor belts of said second conveyor means.

17. The apparatus as recited in claim 16 wherein said positioning means includes a substantially vertically aligned back support having an upper portion angularly oriented and connected with said means for inserting poultry at the top of said apparatus and said plurality of cutting means includes third blade means disposed adjacent said upper portion of said back support and above said first and second blade means for severing the wings from the poultry.

18. The apparatus as recited in claim 17 wherein said guide means includes a plurality of offset rods disposed below said first and second conveyor means for orienting the body of the poultry in a horizontal position, said positioning means includes a plurality of rods disposed in parallel with said plurality of guide rods for holding the body of the poultry together after the body has been split into two pieces by said second blade means, and cutting means disposed below said plurality of guide rods and said plurality of positioning rods for severing the thighs of the poultry from the ribs.

19. The apparatus as recited in claim 18 wherein said guide means includes a pair of parallel rods extending downwardly from said means for inserting poultry at the top of said apparatus for guiding the thighs of the poultry and a guide strip extending downwardly from said means for inserting poultry at the top of said apparatus or guiding the breast of the poultry, and said positioning means includes a plurality of rods extending downwardly from said means for inserting poultry at the top of said apparatus for positioning the wings of the poultry for severing by said third blade means.

20. Poultry cutting apparatus comprising in combination, a plurality of cutting means, conveyor means for moving a poultry body relative to said cutting means, guide means arranged to position selected portions of a poultry body moving on the conveyor means for selectively severing of the wings from the body, and thighs from said body; for severing the legs from the thighs and for severing the breast from the body during said movement, and means to fold the wings severed by said cutting means.

21. The invention defined in claim 20, wherein said means to fold the wings includes a plurality of members positioned adjacent said cutting means for movement converging on a wing.

22. The invention defined in claim 21, wherein said members are positioned for reciprocatory movement toward and away from a wing.

23. The invention defined in claim 22, wherein said means to fold a wing includes at least three members, each of said three members being movable in a path generally normal to the path of movement of the other two members.

24. The invention defined in claim 23, wherein one of said three members is movable from a position at said cutting means to receive a severed wing to another position said two other members being positioned to converge on said wing at said another position.

25. The invention defined in claim 24, wherein said means to fold a wing includes a fourth member movable toward and away from said wing at said another position.

26. The invention defined in claim 24, wherein said one member is movable to a further position to release a folded wing.

27. Apparatus for preparing poultry for cooking comprising means for severing the wing portion from a poultry carcass, means to receive a folded wing portion, and means to fold automatically a severed wing portion and to deliver said folded wing portion to said receiving means.

28. The invention defined in claim 27, wherein said means to fold a severed wing portion includes carrier means to position a severed wing portion and a plurality of elements mounted for coacting movement toward and away from a wing portion when positioned by said carrier means.

29. The invention defined in claim 28, wherein at least one of said plurality of elements is reciprocatorily movable in a straight line.

30. The invention defined in claim 28, wherein said carrier means is movable between a first position to accept a severed wing portion and a second position to deliver the wing portion to said receiving means.

31. The invention defined in claim 30, wherein said carrier means is also movable to an intermediate position for cooperation with said folding means.

* * * * *